(12) United States Patent
Joly-Pottuz

(10) Patent No.: US 8,109,560 B2
(45) Date of Patent: Feb. 7, 2012

(54) SUPPORT FOR THE FRONT UNIT OF A MOTOR VEHICLE AND METHOD FOR ITS PRODUCTION

(75) Inventor: Pascal Joly-Pottuz, Lenting (DE)

(73) Assignee: Faurecia Kunststoffe Automobilsysteme GmbH, Ingolstadt (DE)

( * ) Notice: Subject to any disclaimer, the term of this patent is extended or adjusted under 35 U.S.C. 154(b) by 358 days.

(21) Appl. No.: 12/440,268

(22) PCT Filed: Sep. 17, 2007

(86) PCT No.: PCT/EP2007/059793
§ 371 (c)(1),
(2), (4) Date: May 28, 2009

(87) PCT Pub. No.: WO2008/043642
PCT Pub. Date: Apr. 17, 2008

(65) Prior Publication Data
US 2009/0315344 A1    Dec. 24, 2009

(30) Foreign Application Priority Data
Oct. 6, 2006 (DE) .......................... 10 2006 047 800

(51) Int. Cl.
*B60R 21/34* (2006.01)
*B62D 25/08* (2006.01)
(52) U.S. Cl. ............... 296/187.04; 293/107; 296/193.09
(58) Field of Classification Search ................. 293/106, 293/107, 110, 117, 134; 296/187.03, 187.04, 296/187.09, 193.09, 203.01, 203.02; 180/68.4; B60R 19/20, 21/34
See application file for complete search history.

(56) References Cited

U.S. PATENT DOCUMENTS

| | | | |
|---|---|---|---|
| 5,460,420 A * | 10/1995 | Perkins et al. ................ 293/106 |
| 6,450,276 B1 | 9/2002 | Latcau | |
| 6,523,886 B2 | 2/2003 | Hoffner et al. | |
| 6,598,914 B1 * | 7/2003 | Dixon ........................... 293/106 |
| 7,374,145 B2 | 5/2008 | Ohashi et al. | |
| 2001/0039949 A1 | 11/2001 | Loubser | |
| 2002/0117875 A1 | 8/2002 | Hoffner et al. | |
| 2004/0238247 A1 | 12/2004 | Ohashi et al. | |

(Continued)

FOREIGN PATENT DOCUMENTS
DE  199 46 995 A1  4/2000
(Continued)

OTHER PUBLICATIONS

International Search Report published on Apr. 17, 2008 for PCT/EP2007/059793 filed Sep. 17, 2007.

(Continued)

*Primary Examiner* — Dennis Pedder
*Assistant Examiner* — Jason S Daniels
(74) *Attorney, Agent, or Firm* — Martin Fleit; Paul D. Bianco; Fleit Gibbons Gutman Bongini & Bianco PL

(57) ABSTRACT

A front end assembly mounting for the front unit of a motor vehicle including a mounting and a container for holding an operating fluid integrated together with the front side of the container projecting forwardly. The container is arranged in an installation position at the height of an impact region of a leg or hip of a pedestrian to absorb energy in case of impact with a pedestrian.

12 Claims, 3 Drawing Sheets

U.S. PATENT DOCUMENTS

2004/0262952 A1   12/2004   Kempf et al.

FOREIGN PATENT DOCUMENTS

| | | |
|---|---|---|
| DE | 600 00 006 T2 | 3/2002 |
| DE | 20 2006 001 307.5 U1 | 5/2006 |
| DE | 600 24 933 T2 | 8/2006 |
| EP | 1 024 075 A1 | 8/2000 |
| EP | 1 036 730 A2 | 9/2000 |
| EP | 1 232 932 A1 | 8/2002 |
| EP | 1 457 406 A2 | 9/2004 |
| FR | 2598129 A1 * | 11/1987 |
| FR | 2 809 061 A1 | 11/2001 |
| FR | 2 879 517 A1 | 6/2006 |
| WO | 2001039949 A2 | 6/2001 |
| WO | 2007/085582 | 1/2007 |

OTHER PUBLICATIONS

International Preliminary Report on Patentability published May 1, 2009 for PCT/ EP07/059793 filed Sep. 17, 2007 (Eng. translation).
Written Opinion published Apr. 6, 2009 for PCT/ EP07/059793 filed Sep. 17, 2007.

* cited by examiner

SUPPORT FOR THE FRONT UNIT OF A MOTOR VEHICLE AND METHOD FOR ITS PRODUCTION

CROSS-REFERENCE TO RELATED APPLICATIONS

The instant application is a U.S. National stage application of International Application PCT/EP2007/059793, filed Sep. 17, 2007, which designated the United States and which claims priority of German Application DE 10 2006 047 800.2, filed Oct. 6, 2006, both of which are hereby incorporated by reference.

BACKGROUND OF THE INVENTION

The invention relates to a mounting for the front unit of a motor vehicle, a method for its production, and also a motor vehicle front unit.

EP 1 232 932 A1 shows a mounting for the front unit of a motor vehicle with a mounting part for connecting to the fenders and to the chassis of the motor vehicle. A socket part for holding a headlight unit and for connecting to a bumper is attached to the mounting part.

Other similar front units have become known from FR 2 809 061 and DE 199 46 995 A1.

Furthermore, from DE 600 00 006 T2 a front assembly for a vehicle with a mounting structure and a headlight is known, wherein the headlight is attached to the mounting structure between a pre-assembled and a final, assembled position so that it can rotate about an inclined axis.

From EP 1 036 730 A2 a method for precision assembly of components of a motor vehicle front end is known. Here, a plurality of mutually influencing tolerances can be taken into account.

DE 20 2006 001 307.5 discloses a motor vehicle longitudinal beam and a motor vehicle front unit with a bumper cross beam and flanges arranged on both sides on the bumper cross beam, wherein the flanges have attachment means for attaching the motor vehicle front unit to the motor vehicle longitudinal beams.

DE 600 24 933 T2 discloses an installation unit for a front end of a vehicle, wherein the front end is composed of two parts, with one of the parts consisting of at least one fluid storage container.

Such mountings are typically made as hybrid structures made from metal and plastic.

BRIEF SUMMARY OF THE INVENTION

Therefore, the invention is based on the problem of creating an improved mounting for the front unit of a motor vehicle, a motor vehicle front unit, and also a production method for the mounting of the front unit.

The problems forming the basis of the invention are each solved with the features of the independent claims. Embodiments of the invention are specified in the dependent claims.

According to one embodiment of the invention, a mounting for the front unit of a motor vehicle is created in which a container for holding an operating fluid is integrated. The container is here arranged in the mounting so that it is located at the height of an impact region of a leg and/or hip of a pedestrian after installation of the mounting in the motor vehicle.

This arrangement of the container leads to improved protection for pedestrians because the container is deformable and thus acts as an energy absorption body if a pedestrian impacts the front of the vehicle. In particular, a deformation path can be created by the container in the transition area between the vehicle front and the vehicle hood. This is also advantageous, in particular, in connection with a so-called "active hood." An "active hood" is a device that raises the front hood of the motor vehicle when a sensor detects an impending impact with a pedestrian.

According to one embodiment of the invention, an upper boundary of the mounting is formed by the top side of the container. For example, the mounting is composed of a mounting part that has a receptacle region for the container. After the container is integrated into the receptacle region, the upper boundary of the mounting, for example, in a central region of the mounting, is formed by the top side of the container.

According to one embodiment of the invention, the container has an opening for refilling the operating fluid, for example, for water for a windshield wiper system. This opening is accessible from the top side of the mounting and/or the top side of the container. This has considerable handling advantages because bending over the engine compartment is not necessary to refill the water.

According to one embodiment of the invention, the container is made from a transparent or semitransparent plastic material. This simplifies visual inspection on whether sufficient operating fluid is still present in the container. This has the special advantage that if and how much operating fluid is in the container can be recognized immediately after the front hood is opened.

According to one embodiment of the invention, a receptacle region for a lock of the motor vehicle front hood is formed by a wall of the container. For example, the container has a recess by which the receptacle region is formed. Advantageously, the extent of the receptacle region in the x-direction is somewhat longer than the length of the lock, so that the receptacle region is also closed at the front by a section of the container when a lock is installed. This has the advantage that even if there is an impact of a pedestrian in the region of the lock, a sufficiently long deformation path is still available.

According to one embodiment of the invention, an attachment region with which the mounting and the lock are attached to the chassis of the motor vehicle is formed on the container. This can be realized, for example, by screw connections. The attachment region advantageously has a solid construction. In other words, here, no hollow space for holding the operating fluid is formed by the attachment region, in order to guarantee a screw connection with the necessary stiffness.

According to one embodiment of the invention, the container is arranged along an upper flange area of the mounting of the front unit.

According to one embodiment of the invention, ribs are arranged within the container. The ribs are arranged, for example, essentially transverse to an extent of the upper flange area. Reinforcement of the container by the ribs is advantageous because large local stresses can occur in the upper flange area of the mounting. In particular, the transverse ribs arranged in the container are advantageous for receiving torsional forces acting on the mounting.

The reinforcement of the container with the help of ribs has the additional advantage that metal inserts in the mounting part can be partially or completely eliminated. This results in further improvement of the pedestrian protection and also saves weight and realizes simplified production of the mounting part.

According to one embodiment of the invention, the container is divided by the ribs into segments. The segments are connected to each other by a channel formed in the container, so that the operating fluid can be exchanged between the segments. For example, the channel has a groove-like shape constructed in a lower region of the container.

According to one embodiment of the invention, the container is connected to the mounting in its edge regions by a weld connection. For example, the container is connected to the mounting by a vibration welding method or by so-called mirror welding. In particular, the container can be connected in its left and right edge regions to the mounting part by a weld connection.

According to one embodiment of the invention, the container has a two-part or multiple-part construction. For example, the container is made from a lower and an upper container part. The connection of the container parts can be realized by a weld connection, in particular by vibration welding or mirror welding, or by extrusion coating of the container parts, for example, with a so-called multi-injection method or a billion process.

According to one embodiment of the invention, the container is integrated in the mounting by injection molding. The mounting can involve a plastic injection-molding part.

In another aspect, the invention relates to production methods for the production of a mounting according to the invention or a motor vehicle front unit according to the invention.

According to one embodiment of a method according to the invention, the production of the container and the mounting part initially take place separately, wherein the mounting part has a receptacle region for the container. Both the container and also the mounting part can be produced with the help of a plastic injection molding process. In this way, the container can be produced in one piece or as several container parts that are then joined, for example, by welding or injection molding.

According to the production of the container and the mounting part, the container is integrated into the mounting part, for example, by welding, injection molding, and/or screw connections.

According to one embodiment of the invention, the container or its container parts are used as inserts for the production of the mounting in a plastic injection molding process. The container or its container parts are inserted into a plastic injection molding die. In the subsequent plastic injection molding process, the complete mounting is produced through injection molding of the container or the container parts.

The plastic for the production of the mounting in a plastic injection molding method can be, for example, polyamide or polypropylene. For the production of the container or its container parts, for example, polypropylene, polyethylene or polyethylene terephthalate (PET) can be used.

BRIEF DESCRIPTION OF THE SEVERAL VIEWS OF THE DRAWING

Below, embodiments of the invention will be explained in greater detail with reference to the drawings. Shown are.

DETAILED DESCRIPTION OF THE INVENTION

In the description of the following embodiments of the invention, corresponding elements are designated with the same reference symbols.

Figure 1:
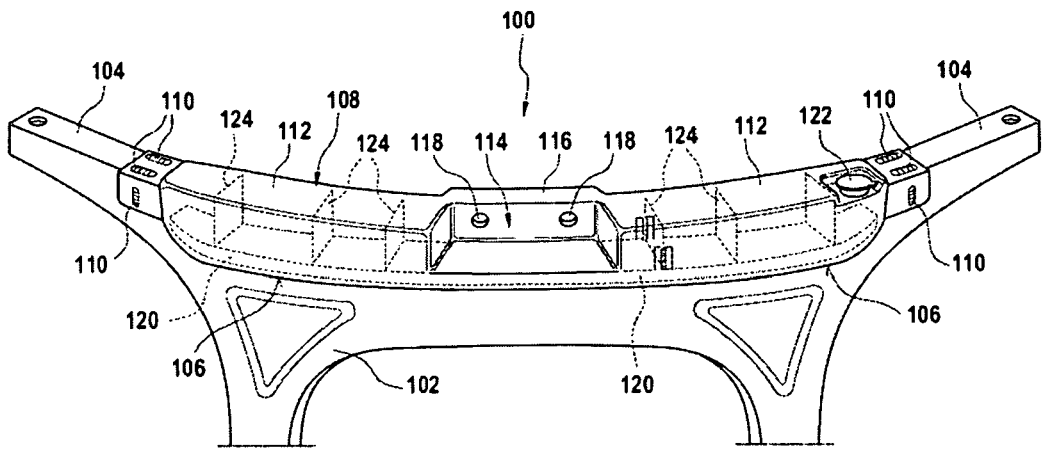
FIG. 1, a perspective view of one embodiment of a mounting according to the invention with an integrated container, FIG. 2, a perspective view of a lower container part, FIG. 3, a plan view of the container part of FIG. 2, FIG. 4, a perspective view of an upper container part, FIG. 5, a connection of a rib of the upper container part to the lower container part, FIG. 6, a perspective view of another embodiment of a mounting according to the invention with an extrusion-coated container, FIG. 7, a sectional view of the mounting of FIG. 6 in the region of the container.

FIG. 1 shows a perspective view of one embodiment of a mounting 100 according to the invention for a motor vehicle front unit. Such a mounting 100 is also designated as a front end assembly mounting.

The mounting 100 has a mounting part 102 for connecting to the chassis of a motor vehicle, such as, for example, to the motor vehicle longitudinal beams and/or to the fender banks of the motor vehicle. In its upper flange region 104, the mounting part 102 has a receptacle region 106 for a container 108 that extends along the upper flange region 104 of the mounting part 102. Advantageously, the receptacle region 106 and the container 108 are arranged centrally as shown in FIG. 1.

In the embodiment shown here, the mounting part 102 and the container 108 are initially produced as separate components. Then the container 108 is integrated into the receptacle region 106 of the mounting part 102, in that it is attached there with suitable means. This is realized, for example, by means of weld connections and/or screw connections.

In the embodiment considered here, the container 108 is connected in its left and right edge regions to the mounting part 102 by weld connections 110. For the production of the weld connections, for example, an ultrasonic welding method can be used. For this purpose, the mounting part 102 is clamped. The container 108 positioned in the receptacle region 106 is set in oscillation with the help of an ultrasonic horn, so that the weld connections 110 are produced.

Alternatively, a so-called mirror welding method can also be used in which the regions of the mounting part 102 and the container 108 to be welded to each other are heated and then pressed together.

After integration of the container 108 in the mounting part 102, the upper side 112 of the container 108 simultaneously forms the upper boundary of the mounting 100 in its middle region.

Figure 8:
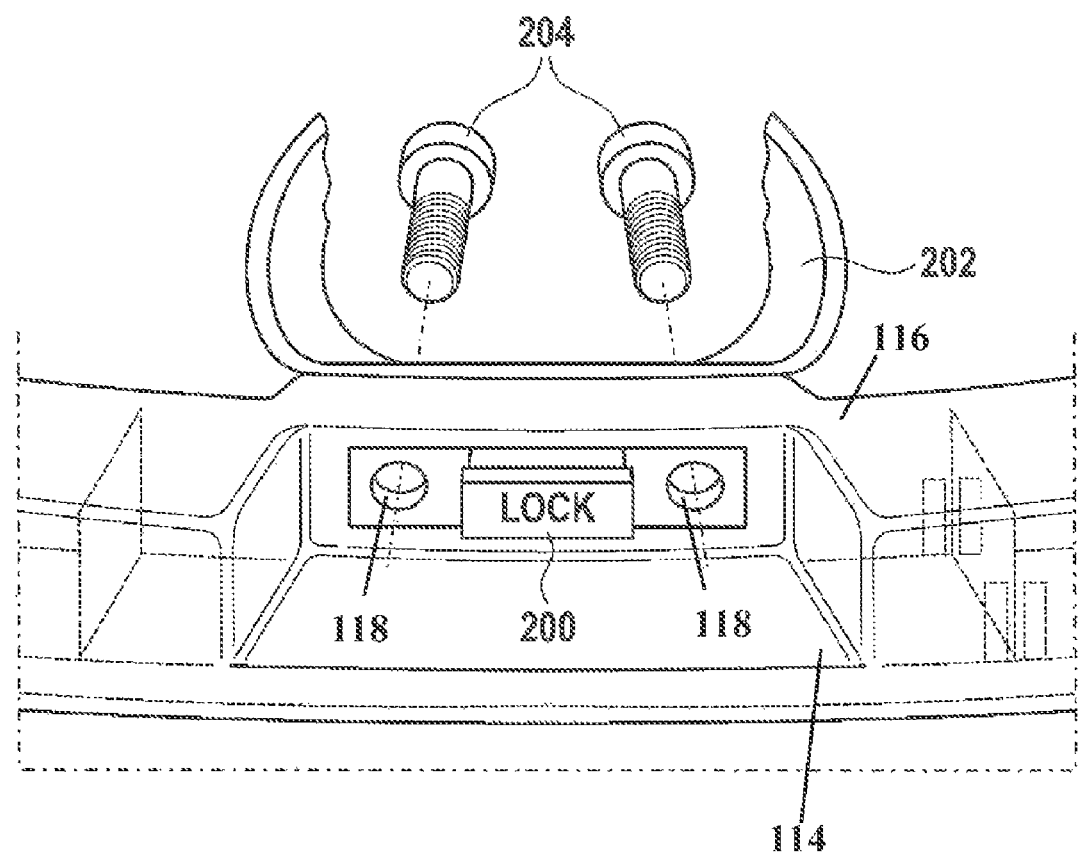
FIG. 8 is a partially exploded detail view schematically showing the container receptacle and hood lock connected by screws to the chassis of a motor vehicle.

In the embodiment considered here, the container 108 forms a receptacle region 114 for a lock of a front hood of the motor vehicle. The receptacle region 114 is closed toward the rear by an attachment region 116. The attachment region 116 is used for attaching the container 108 and the lock 200 to the chassis 202 of the motor vehicle. For this purpose, the attachment region 116 has holes 118 for the passage of screws 204, see FIG. 8. These screws run from one chassis part of the motor vehicle through the holes 118 to the lock. By tightening the screws, both the lock and also the container 108 are fixed to the chassis of the motor vehicle.

The attachment region 116 has a solid construction, i.e., it encloses no hollow space for holding the operating fluid. Therefore, the attachment region 116 obtains the necessary stiffness for attaching the container 108 and the lock. For example, the attachment region 116 has a plate-shaped construction as shown in the embodiment of FIG. 1.

The container 108 is divided into a left and a right container region by the receptacle region 114. The left and right container regions are connected to each other by a channel 120, wherein operating fluid can be exchanged between the left and the right container regions by means of this channel.

By means of the filler neck 122 constructed on the top side 112 of the container 108, operating fluid can be filled into both container regions because these are indeed connected by means of the channel 120. When the operating fluid is refilled, this runs from the right container region via the channel 120 into the left container region, so that this region is also filled.

The receptacle region 114 that is formed by the container 108 is closed toward the front by the channel 120. The size of the receptacle region 114 is advantageously selected so that its extent in the x-direction, i.e., in the longitudinal direction of the vehicle, is somewhat larger than the extent of the lock in the x-direction. Therefore, the container 108 projects, in particular, with its channel 120, forward past the extent of the lock. This has the advantage that, in the case of an impact in the region of the lock, a pedestrian does not impact the lock, but instead the container.

In the container 108, there are reinforcement ribs 124 that run transverse to the direction of extent of the upper flange region 104. By means of the reinforcement ribs 124, the stresses, in particular, the torsional forces that can appear in the upper flange region 104, can be better absorbed.

Due to the channel 120, a fluid can be exchanged between the individual segments of the container 108 formed by the reinforcement ribs 124.

The container 108 is connected to a windshield wiping system of the motor vehicle, for example, by means of a hose not shown in FIG. 1. In this case, the container 108 is used for holding water with or without accessories for the windshield wiping system of the motor vehicle.

In the installed state of the mounting 100, the upper flange region 104 is located, for each vehicle type, in the impact region of a leg and/or hip of a pedestrian. Because the container 108 involves a hollow body, this acts as an energy absorption body in the case of an impact with a pedestrian and mitigates the consequences of such an impact due to the available deformation path. Such a deformation path is especially advantageous at the transition between the front unit of the motor vehicle and the front hood, in particular, in combination with a so-called active hood.

Figure 2:
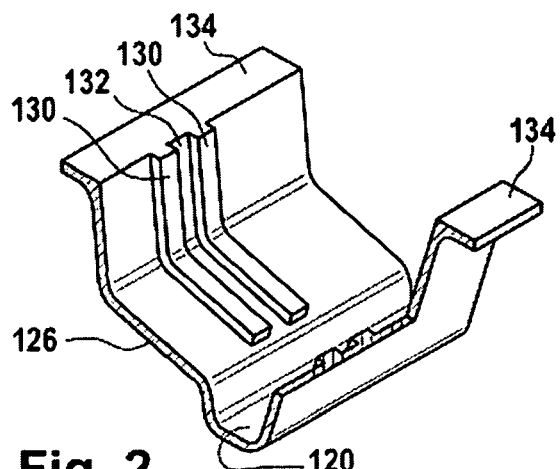
Figure 3:
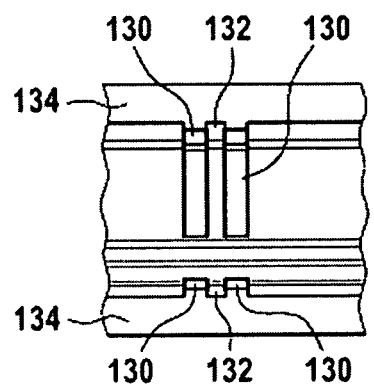
Figure 4:
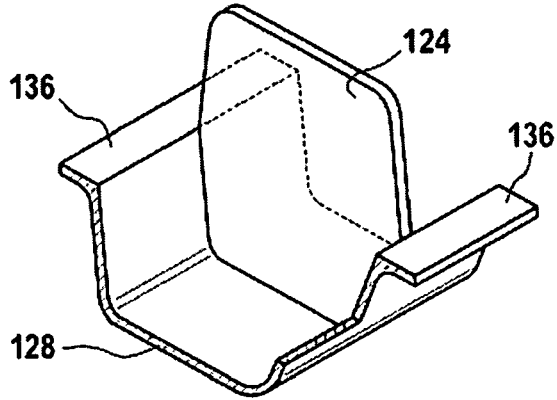

FIGS. 2-5 show an embodiment of the container 108 with a lower container part 126 and an upper container part 128 (cf. FIG. 4). In a perspective view, FIG. 2 shows a section of the lower container part 126. At the edge of the lower container part 126, the channel 120 has a groove-shaped construction. Rail-shaped ribs 130 between which a groove 132 is formed, as also shown in FIG. 3, run transverse to the direction of extent of the lower container part 126.

Figure 5:
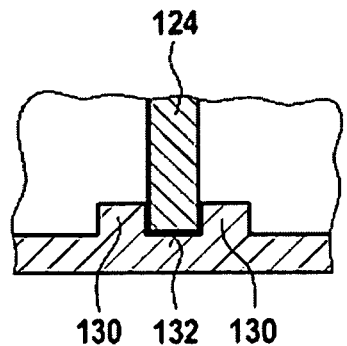

FIG. 4 shows a section of the upper container part 128 in a perspective view. This section has one of the reinforcement ribs 124 (cf. FIG. 1). For the production of the container 108, the lower container part 126 and the upper container part 128 are joined, in that the reinforcement ribs 124 are each positioned in a groove 132 of the lower container part 126, as shown in FIG. 5. In this position, the container parts 126 and 128 are connected to each other, for example, by a welding process or by injection molding. For example, the welding between the reinforcement ribs 124 and the ribs 130 is realized by an ultrasonic welding process or by mirror welding.

The reinforcement rib 124 shown as an example in FIG. 4 is here shaped so that it does not close the channel 120, in order to allow the exchange of operating fluid between the individual segments formed between the reinforcement ribs 124 and between the left and right container regions.

For increasing the stiffness of the container 108, as shown in FIGS. 2 and 4, joint surfaces 134 can be arranged along one boundary of the lower container part 126 and joint surfaces 136 can be arranged along one boundary of the upper container part 128. For the production of the container 108, the joint surfaces 134 and 136 are placed one on the other, in order to connect these to each other, for example, by a welding process or by injection molding.

Figure 6:
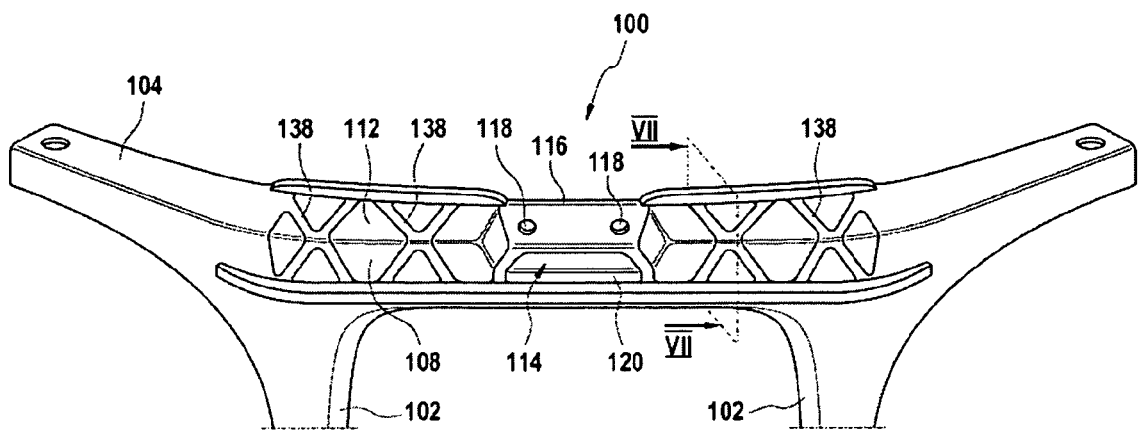

FIG. 6 shows another embodiment of a mounting 100 according to the invention. In this embodiment, first the container 108 is produced. The container 108 is then injection molded, so that the mounting 100 with the mounting part 102 and the container 108 integrated therein is obtained. This can be realized in such a way that the container 108 or its container parts 126 and 128 (cf. FIGS. 2-5) are placed in a plastic injection molding die.

Through subsequent injection coating of the container 108 or its parts 126, 128, the mounting 100 is then produced in a plastic injection molding process. In this way, different plastics can be used for the mounting part 102 and the container 108.

In particular, for the container 108, a transparent or semi-transparent plastic is advantageously used, so that the level of operating fluid in the container 108 can be easily determined visually by a user. In this case it is advantageous if the container 108 is not completely covered by the plastic of the mounting part 102, so that the fluid level in the container 108 remains visually detectable.

In the embodiment of FIG. 6, this is solved by cross-shaped regions 138 of the mounting part 102 that fix the container 108 within the mounting 100 and nevertheless leave an adequate view of the container 108, in order to be able to inspect the fluid level.

In the embodiment considered here, the attachment region 116 is not formed as part of the container 108, but instead as part of the mounting part 102. The attachment region 116 is thus formed by injection molding of the container 108 in the production of the mounting part 102.

Figure 7:
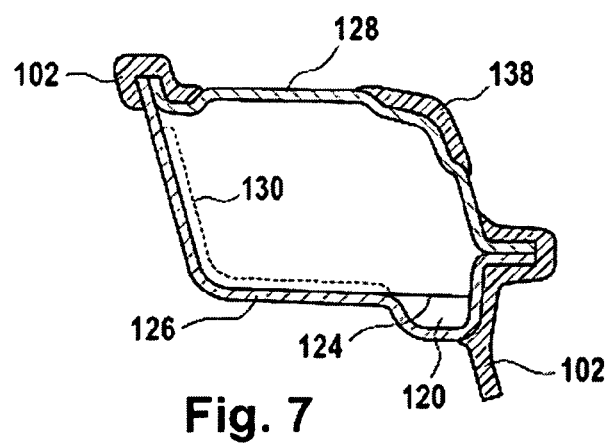

FIG. 7 shows a cross section through the mounting 100 in the area of the container 108.

LIST OF REFERENCE SYMBOLS

100 Mounting
102 Mounting part
104 Upper flange region
106 Receptacle region
108 Container
110 Weld connection
111 Front side
112 Top side
114 Receptacle region
116 Attachment region
118 Hole
120 Channel
122 Filler neck
124 Reinforcement rib
126 Container part
128 Container part
130 Rib
132 Groove
134 Joint surface
136 Joint surface
138 Cross-shaped region

The invention claimed is:

1. A front end assembly mounting for a motor vehicle comprising an elongated mounting having a front side and a rear side and having a central region forming a receptacle; and an elongated deformable container having a hollow interior for holding an operating fluid and having a top side and a front side mounted in the receptacle of said mounting and integrated into the central region of in the mounting so that the top side of the container forms the upper boundary of the assembly and the front side of the container projects forwardly to present a most forward surface; said container being arranged in an installation position with respect to a motor vehicle at a height of an impact region of a leg or hip of a pedestrian, so that in the case of an impact with a pedestrian by a vehicle, the container will first impact with the pedestrian and act as an energy absorption body.

2. The front end assembly mounting according to claim 1, wherein an upper boundary of the mounting is formed by a top side of the container.

3. The front end assembly mounting according to claim 1, wherein an opening of the container for refilling operating fluid is accessible at an upper boundary of the assembly.

4. The front end assembly mounting according to claim 1, wherein the container is arranged along an upper flange region of the mounting.

5. A front end assembly mounting for a motor vehicle comprising an elongated mounting having a front side and a rear side and having a central region forming a receptacle; and an elongated deformable container having a hollow interior for holding an operating fluid and having a top side and a front side mounted in the receptacle of said mounting and integrated into the central region of the mounting so that the top side of the container forms the upper boundary of the assembly and the front side of the container projects forwardly to present a most forward surface; said container is being arranged in an installation position with respect to a motor vehicle at a height of an impact region of a leg or hip of a pedestrian, so that in the case of an impact with a pedestrian by a vehicle, the container will first impact with the pedestrian and act as an energy absorption body, and wherein a second receptacle region for a lock for locking a front hood of the motor vehicle is formed by a wall of the container at an intermediate position between its ends.

6. The front end assembly mounting according to claim 5, wherein a portion of the container underlies the second receptacle region for providing fluid communication to portions of said container on opposite sides of the second receptacle region.

7. The front end assembly mounting according to claim 5, wherein the second receptacle region is closed toward the rear by an attachment region of a container wall, wherein the attachment region is formed for attaching a lock and the container to the chassis of a motor vehicle.

8. A method for the production of a front end assembly mounting comprising the steps of producing an elongated, deformable container having a hollow interior for holding an operating fluid, and integrating the container into a receptacle formed in the central region of an elongated mounting having a front side and a rear side with the front side of the container projecting forwardly of the mounting whereby the said container is can be arranged in an installation position with respect to a motor vehicle at a height of an impact region of a leg or hip of a pedestrian, so that in the case of an impact with a pedestrian by a vehicle, the container will first impact with the pedestrian and act as an energy absorption body.

9. The method according to claim 8, wherein the integration of the container with the mounting is accomplished by welding.

10. The method according to claim 9, wherein the welding is performed in longitudinal edge regions of the container and further including the step of forming a screw connection in a middle region of the mounting for further attaching the container to the chassis of a motor vehicle.

11. The method according to claim 10, including the further step of attaching a lock to the assembly by the screw connection.

12. The method according to claim 8, wherein the container is integrated into the mounting through injection molding.

\* \* \* \* \*